(12) United States Patent
Slenz

(10) Patent No.: US 6,960,241 B1
(45) Date of Patent: Nov. 1, 2005

(54) PAPER TRAP

(76) Inventor: Douglas S. Slenz, W358 S4671 Chickory Ct., Dousman, WI (US) 53118

( * ) Notice: Subject to any disclaimer, the term of this patent is extended or adjusted under 35 U.S.C. 154(b) by 165 days.

(21) Appl. No.: 10/626,331

(22) Filed: Jul. 24, 2003

(51) Int. Cl.$^7$ ..................... B01D 29/62; B01D 35/143; B01D 35/147
(52) U.S. Cl. ............................. 95/19; 95/280; 95/273; 55/283; 55/302; 55/312; 55/432; 55/465; 96/400; 96/421
(58) Field of Search ........................... 95/273, 280, 19; 55/283, 302, 309, 312, 432, 465; 96/400, 96/421

(56) References Cited

U.S. PATENT DOCUMENTS 3,129,587 A * 4/1964 Hallanger ................ 73/861.61
4,369,050 A 1/1983 Leist ........................ 55/283

FOREIGN PATENT DOCUMENTS

CH 675366 A5 * 9/1990 .................. 55/342

* cited by examiner

Primary Examiner—Robert A. Hopkins
(74) Attorney, Agent, or Firm—Donald J. Ersler

(57) ABSTRACT

A paper trap includes a trap chamber. An outlet of the trap chamber is preferably connected to an inlet of the exhaust bypass damper. An inlet of the trap chamber is coupled to dust capture hoods and an outlet of the bypass chamber is coupled to a dust collector. A perforated plate is disposed in the trap chamber to prevent scraps of paper from passing through the paper trap. The paper trap includes a normal operating position and a cleaning position. In a normal operating position, air from the dust capture hoods flows through the paper trap. In a cleaning position, a paper disposal opening is uncovered to remove scraps of paper from the perforated plate. A junction between the trap chamber and bypass chamber is covered and a bypass inlet uncovered. Air flows into the bypass inlet and out-of-the outlet of the bypass chamber.

12 Claims, 8 Drawing Sheets

PAPER TRAP

BACKGROUND OF THE INVENTION

1. Field of the Invention

The present invention relates generally to the paper manufacturing industry and more specifically to a paper trap used within a dust control system, which traps paper scrap more efficiently than the prior art.

2. Discussion of the Prior Art

U.S. Pat. No. 4,369,050 to Leist discloses a self cleaning paper trap. The self cleaning paper trap includes a housing, which carries a plurality of spaced grid bars to trap the sheet materials and a wiper bar, which is vertically reciprocal relative to the grid bars to wipe trapped sheet materials from the bars.

However, the spacing between the plurality of spaced grid bars will allow smaller pieces of paper scrap to pass through to a downstream dust collector. The paper scrap can result in plugging of filters in a dust collector or plugging of spray nozzles in a wet scrubber.

Accordingly, there is a clearly felt need in the art for a paper trap, which traps scraps of paper, traps smaller pieces of paper and has less complexity than that of the prior art.

SUMMARY OF THE INVENTION

The present invention provides a paper trap, which is less complex than that of the prior art. The paper trap includes a trap chamber. The trap chamber includes an inlet, an outlet and a paper disposal opening. The outlet of the trap chamber is preferably connected to a process inlet of an exhaust bypass damper. The bypass chamber includes the process inlet, a bypass inlet and an outlet. The inlet of the trap chamber is coupled to dust capture hoods through duct work and the outlet of the trap chamber is connected to the process inlet of the exhaust bypass damper. The outlet of the exhaust bypass damper is coupled to a dust collector through duct work. A perforated plate is located in the trap chamber to prevent scraps of paper from passing through the outlet of the exhaust bypass damper. The paper disposal opening is covered with a paper disposal door.

The paper trap has a normal operating position and a cleaning position. Air flow from the dust capture hoods includes dust and scraps of paper. The air flows through the perforated plate along with paper dust. Paper scraps are collected on the perforated plate and are removed during a cleaning cycle with the paper trap in a cleaning position. The exhaust bypass damper includes a bypass damper, which covers either the process inlet or the bypass inlet.

When the pressure difference across a thickness of the perforated plate exceeds a predetermined number, the paper trap is placed in the cleaning position. In the cleaning position, the paper disposal door opens and the bypass damper covers the outlet of the trap chamber of the paper trap and the process inlet of the exhaust bypass damper. In a normal operating position, the bypass inlet is covered by the bypass damper. When the bypass damper covers the outlet of the trap chamber, the dust collection system draws air through the bypass inlet instead of dust capture hoods connected to the inlet of the trap chamber. Air flow across the thickness of the perforated plate ceases and the corresponding differential pressure across the perforated plate goes to zero. The zero pressure across the thickness of the perforated plate causes the majority of the paper scraps to drop off the perforated plate and through the paper disposal opening, where the paper scraps may be collected. After a short time delay, compressed air jets from at least one compressed air manifold are directed along the upstream surface of the perforated plate to dislodge any remaining paper scraps that may be clinging to the perforated plate.

Accordingly, it is an object of the present invention to provide a paper trap, which traps more scraps of paper than that of the prior art.

It is a further object of the present invention to provide a paper trap, which traps smaller scraps of paper than that of the prior art.

Finally, it is another object of the present invention to provide a paper trap, which has less complexity than that of the prior art.

These and additional objects, advantages, features and benefits of the present invention will become apparent from the following specification.

DETAILED DESCRIPTION OF THE PREFERRED EMBODIMENTS

Figure 1:
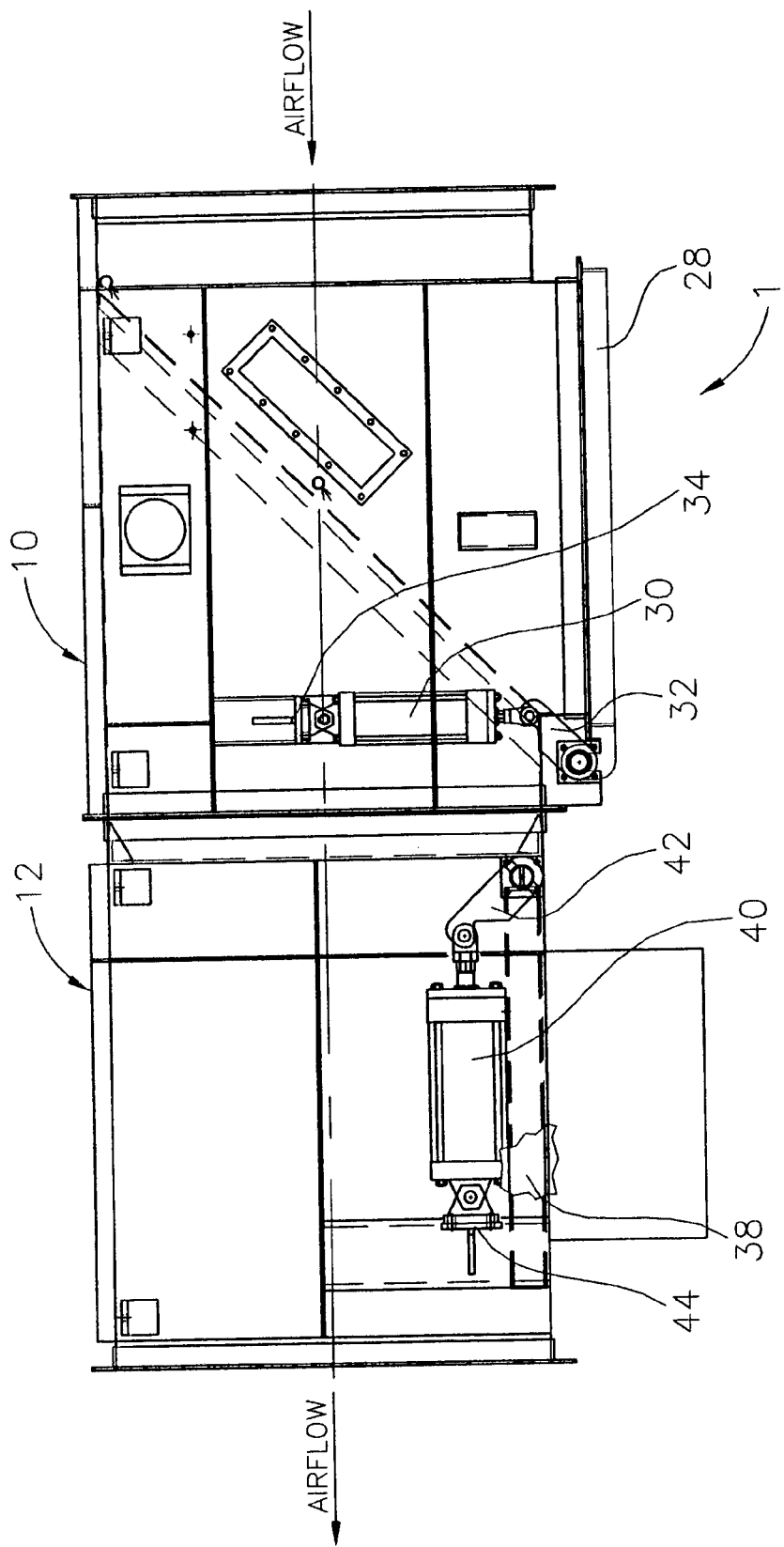
FIG. 1 is a side view of a paper trap and an exhaust bypass damper in a normal operating position in accordance with the present invention.
Figure 2:
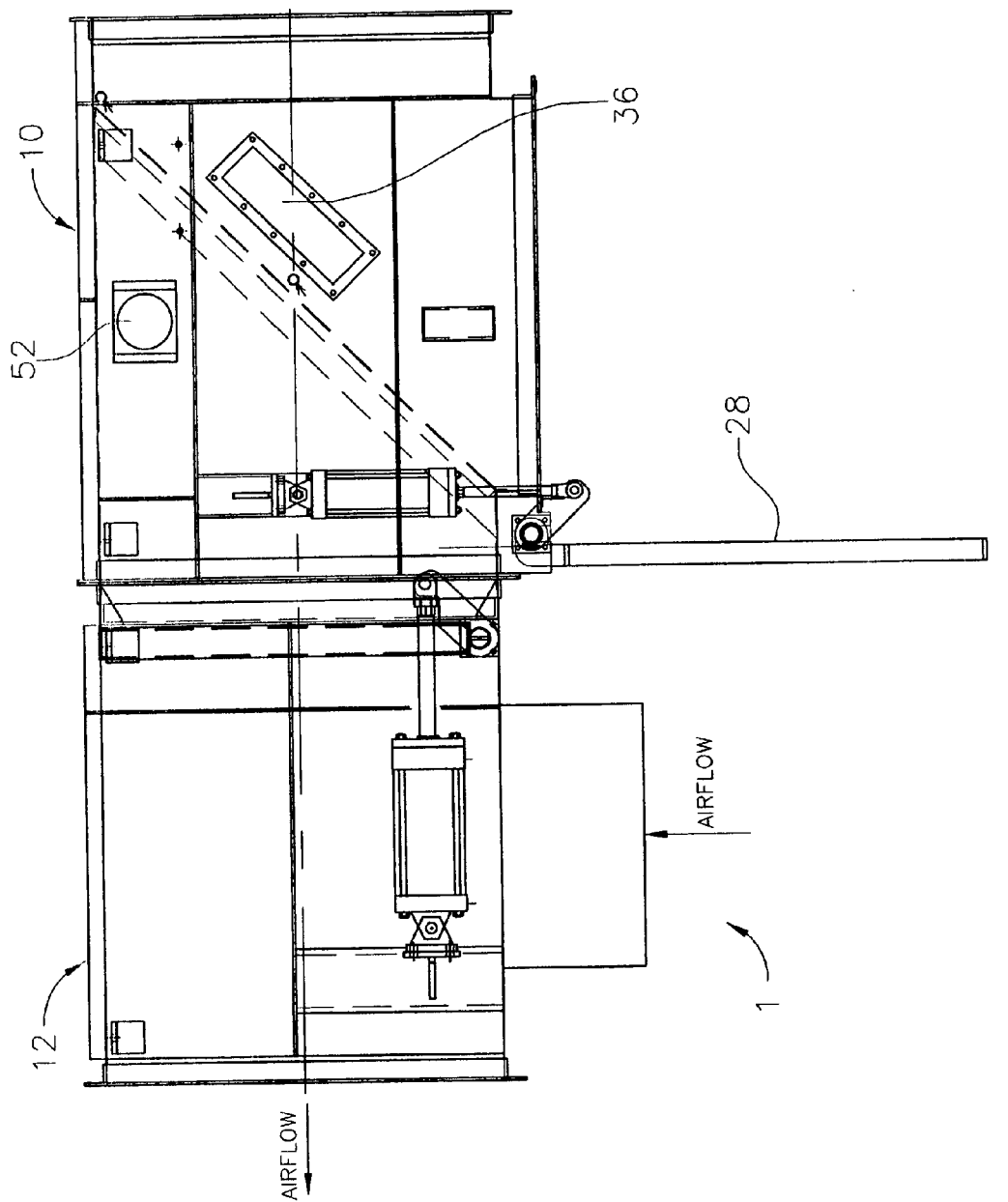
FIG. 2 is a side view of a paper trap and a exhaust bypass damper in a cleaning position in accordance with the present invention.
Figure 3:
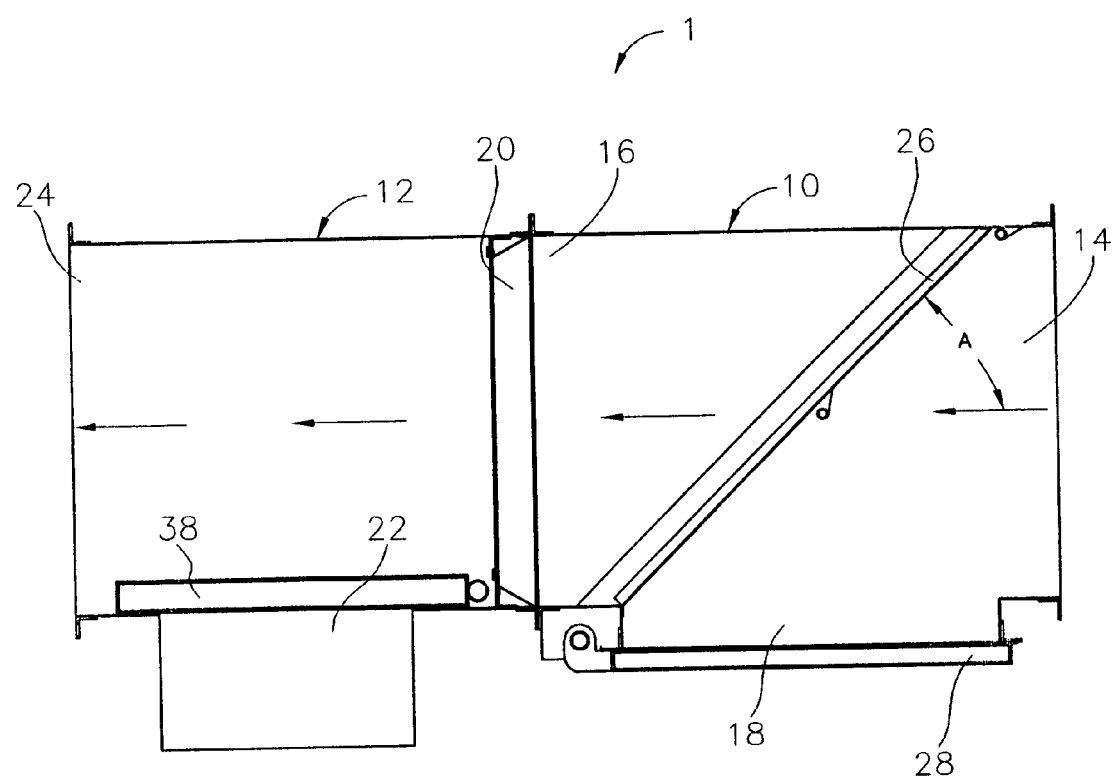
FIG. 3 is a cross sectional view of a paper trap and an exhaust bypass damper in a normal operating position in accordance with the present invention.
Figure 4:
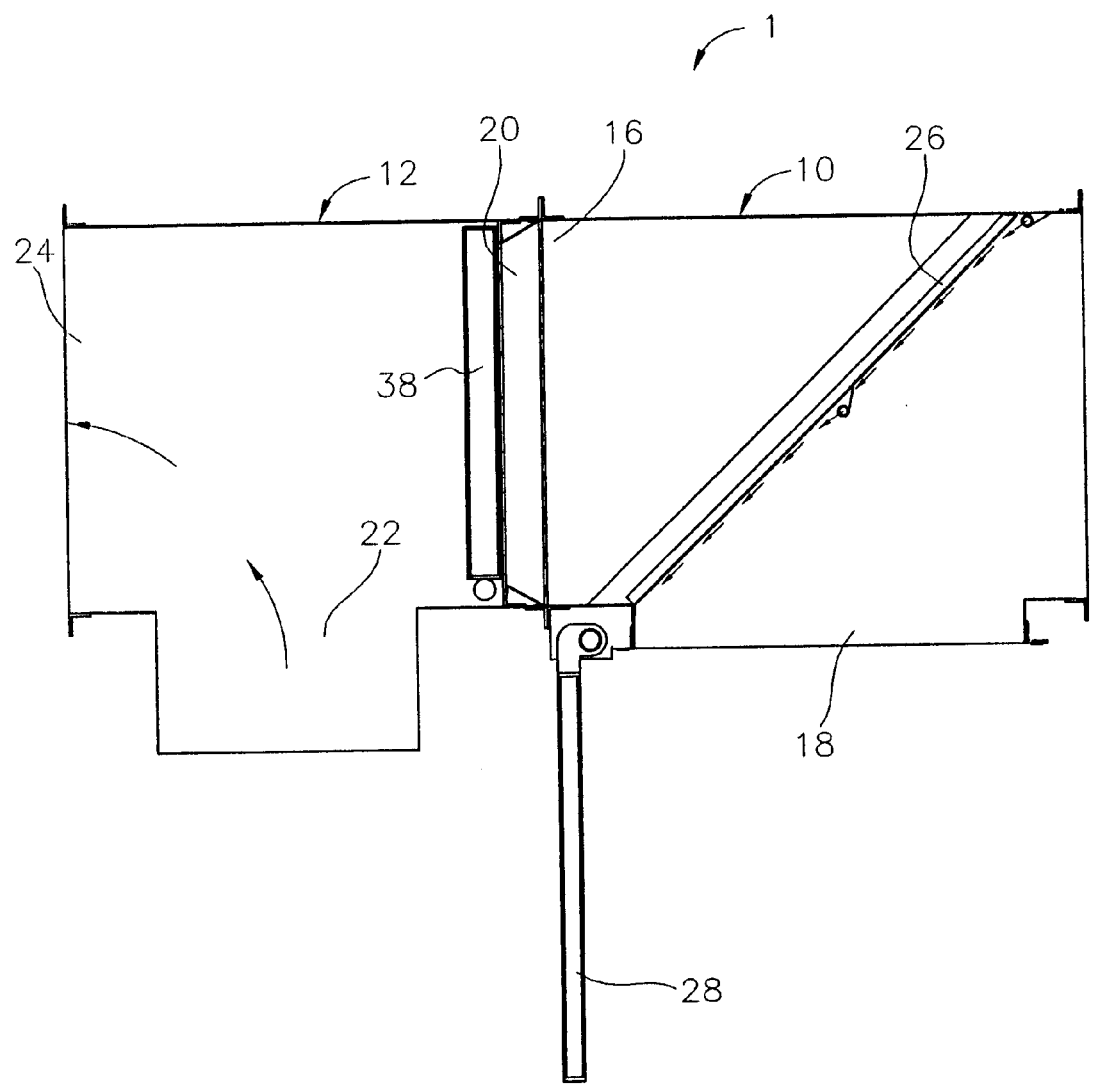
FIG. 4 is a cross sectional view of a paper trap and a exhaust bypass damper in a cleaning position in accordance with the present invention.
Figure 5:
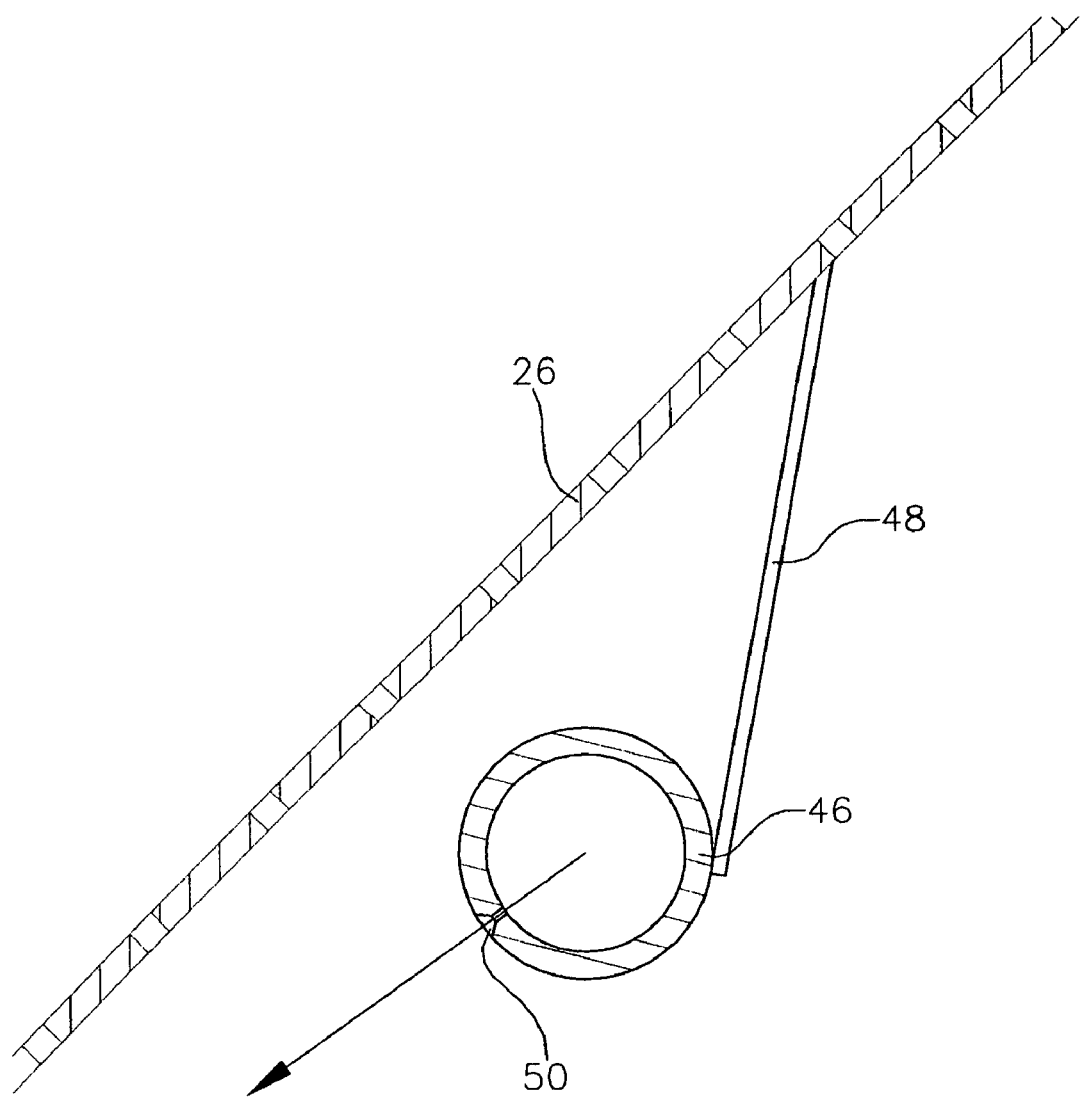
FIG. 5 is an enlarged cross sectional view of a compressed air manifold adjacent a front surface of a perforated plate of a paper trap paper in accordance with the present invention.
Figure 6:
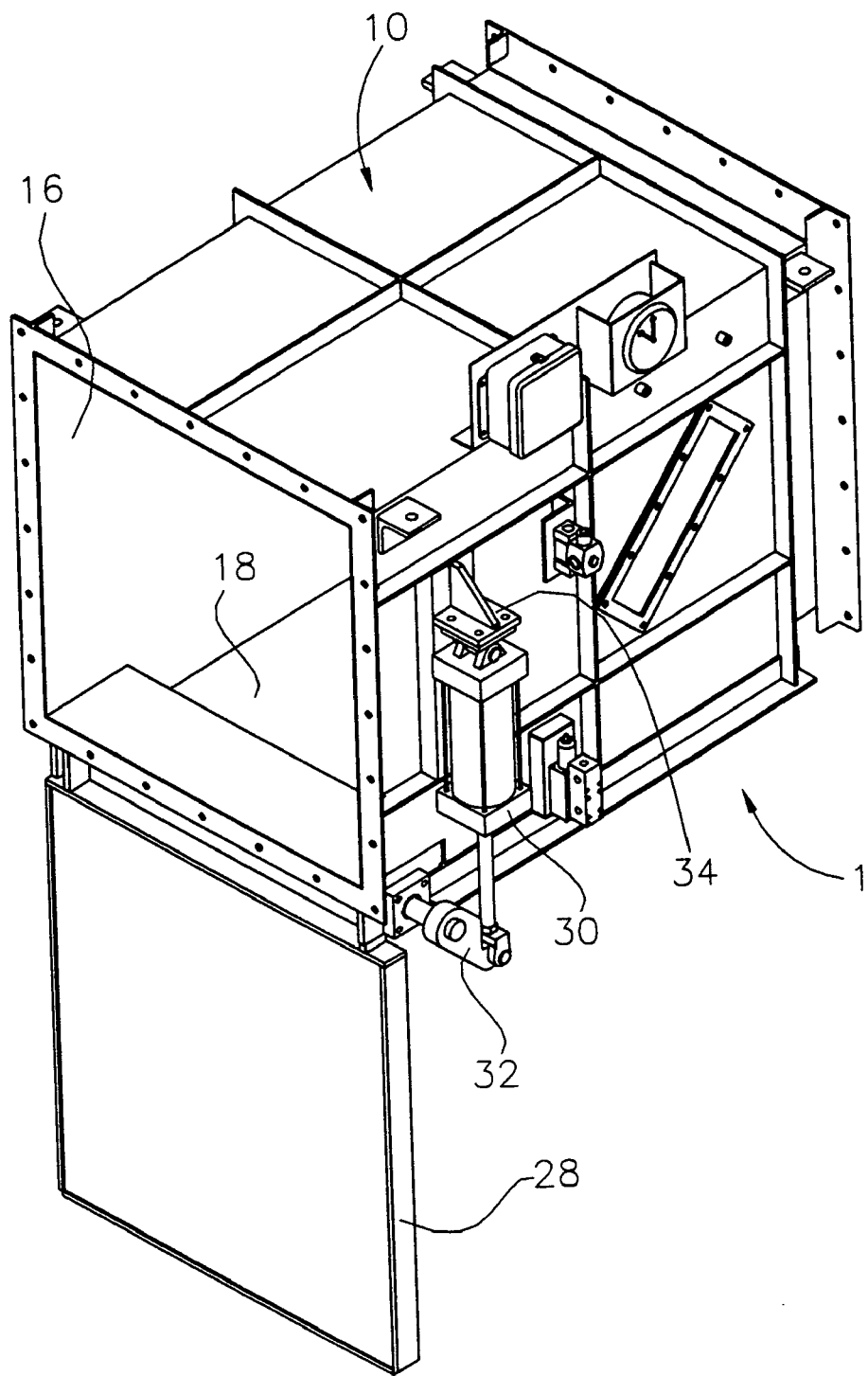
FIG. 6 is a perspective view of a paper trap with a paper disposal door in an open position in accordance with the present invention.
Figure 7:
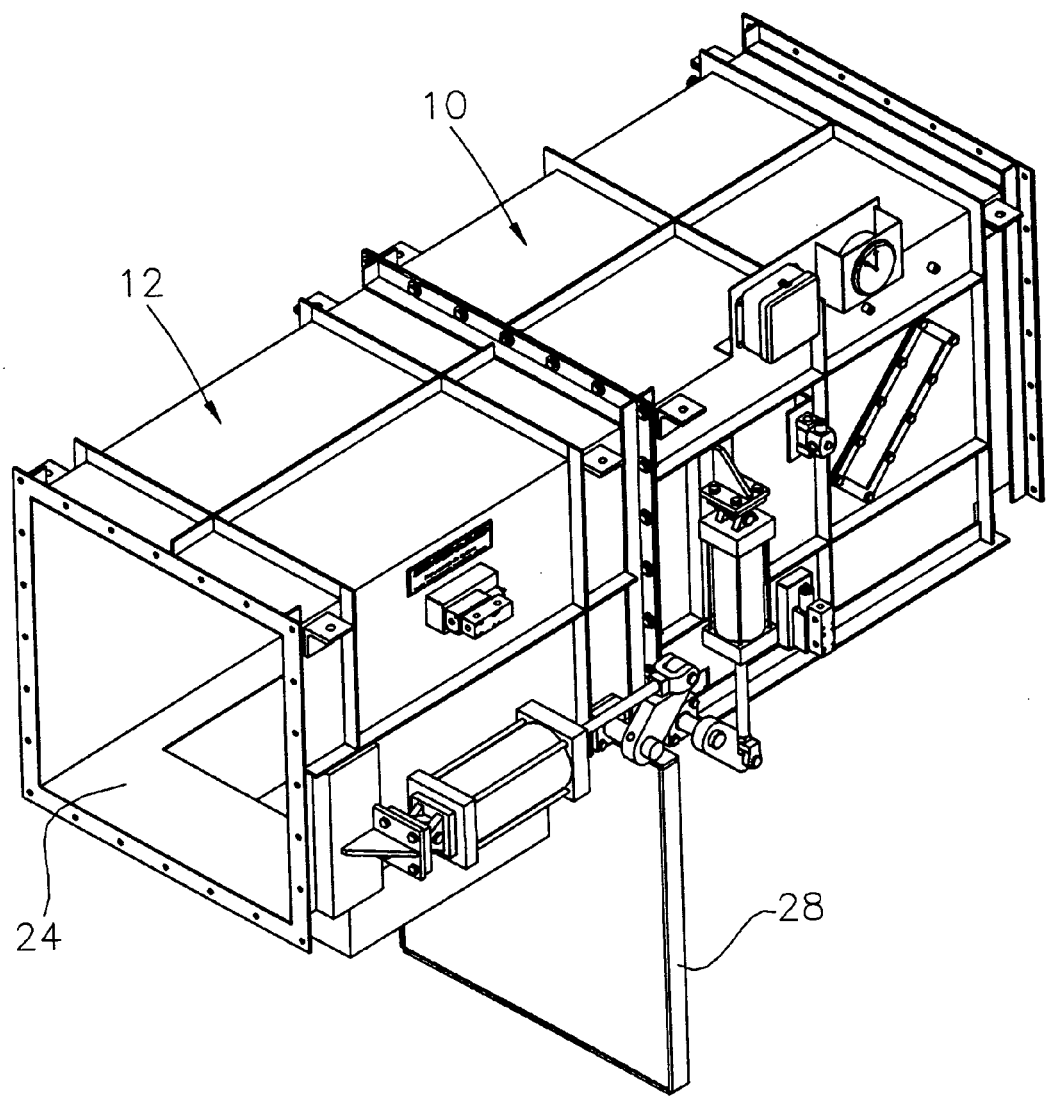
FIG. 7 is a perspective view of an exhaust bypass damper and a paper trap with a paper disposal door in an open position in accordance with the present invention.
Figure 8:
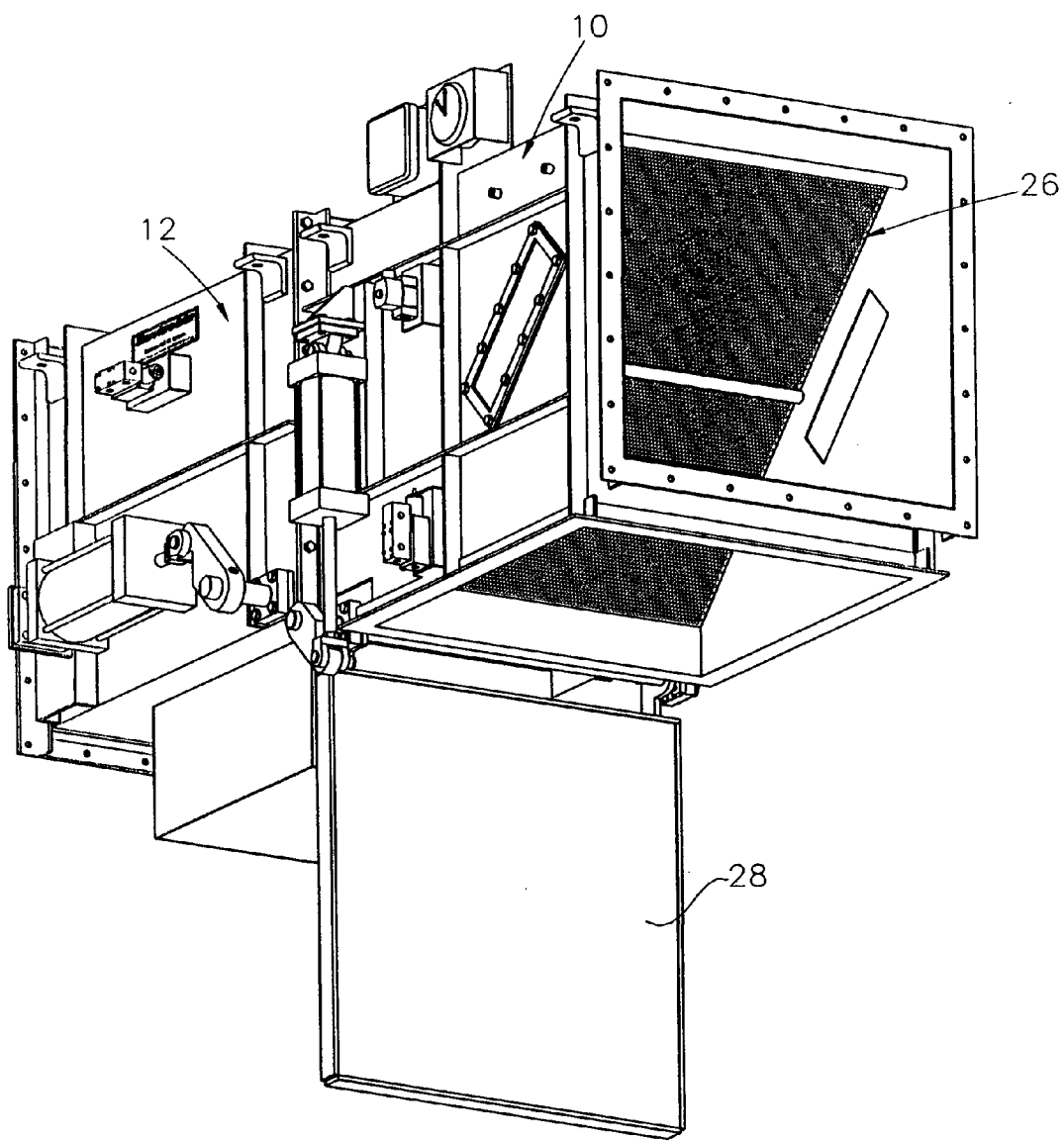
FIG. 8 is a perspective view of a paper trap and exhaust bypass damper with a paper disposal door in an open position in accordance with the present invention.

With reference now to the drawings, and particularly to FIG. 3, there is shown a cross sectional view of a paper trap 1 in a normal operating position. With reference to FIGS. 1, 2 and 4, the paper trap 1 includes a trap chamber 10. The trap chamber 10 includes an inlet 14, an outlet 16 and a paper disposal opening 18. The outlet 16 of the trap chamber 10 is preferably connected to a process inlet 20 of an exhaust bypass damper 12. The exhaust bypass damper 12 includes the process inlet 20, a bypass inlet 22 and an outlet 24. The inlet 14 of the trap chamber 10 is coupled to dust capture hoods through duct work and the outlet 16 of the trap chamber 10 is connected to the process inlet 20 of the exhaust bypass damper 12. Air flow from the dust capture hoods includes dust and scraps of paper. The outlet 24 of the bypass chamber 12 is coupled to a dust collector through duct work.

A perforated plate 26 is retained in the trap chamber 12 with any suitable attachment process to prevent scraps of paper from passing through the outlet 24. The perforated plate 26 is preferably mounted at an angle "A" relative to the flow of air. Preferably, the angle "A" has a value of 45 degrees, but other other angle values may also be used. The paper disposal opening 18 is covered with a paper disposal door 28. The paper disposal door 28 is preferably pivotally attached adjacent a perimeter of the paper disposal opening 18. An actuation device 30 is preferably used to open and close the paper door 28. A paper disposal pivoting arm 32 is attached to an end of the paper door 28. A paper disposal pivot mount 34 is attached to the trap chamber 10. One end of the actuation device 30 is pivotally attached to the paper disposal pivoting arm 32 and the other end is pivotally attached to the paper disposal pivot mount 34. The actuation device 30 is preferably a pneumatic actuated cylinder, but other devices may also be used to open and close the paper door 28. A viewing window 36 is preferably formed in a side wall of the trap chamber 10.

A bypass damper 38 is preferably pivotally attached adjacent a perimeter of the bypass inlet 22. A bypass actuation device 40 is preferably used to pivot the bypass damper 38 between covering the bypass inlet 22 and the process inlet 20. A bypass damper pivoting arm 42 extends from an end of the bypass damper 38. A bypass damper pivot mount 44 is attached to the bypass chamber 12. One end of the bypass actuation device 40 is pivotally attached to the bypass damper pivoting arm 42 and the other end is pivotally attached to the bypass damper pivot mount 44. The bypass actuation device 40 is preferably a pneumatic actuated cylinder, but other devices may also be used to pivot the bypass damper 38. The bypass damper 38 has a normal operating position, when covering the bypass inlet 22 and a cleaning position, when covering the process inlet 20. The operation of the actuation device 32 and the bypass actuation device 40 is preferably implemented with an automatic control device.

With reference to FIGS. 5–8, at least one compressed air manifold 46 is located adjacent a front surface of the perforated plate 26. A deflector plate 48 is attached to an upstream side of each compressed air manifold 46 to prevent paper from building-up under thereof. A plurality of air openings 50 are formed through a wall of each compressed air manifold 46. At least one end of each compressed air manifold 46 is connected to a source of pressurized air. The source of pressurized air is turned on, when the paper trap 10 is in a cleaning position with the automatic control device. However, other methods may be used to remove scraps of paper from the perforated plate 26, besides the at least one air manifold 46.

A pressure switch 52 measures the pressure across the thickness of the perforated plate 26. When the pressure difference exceeds a predetermined number, the paper trap 1 is placed in a cleaning orientation. However, other methods may be used to detect reduced air flow through the perforated plate 26, besides the pressure switch 52.

When the pressure difference across a thickness of the perforated plate 26 exceeds a predetermined number, the paper trap 10 is placed in the cleaning position. In the cleaning position, the paper disposal door 28 opens and the bypass damper 38 covers the outlet 16 of the trap chamber 10/process inlet 20 of the exhaust bypass damper 12. In a normal operating position, the bypass inlet 22 is covered by the bypass damper 38.

When the bypass damper 38 covers the outlet 16 of the trap chamber 10, the dust collection system draws air through the bypass inlet 22 instead of dust capture hoods. Air flow across the thickness of the perforated plate 26 ceases and the corresponding differential pressure across the perforated plate 26 goes to zero. The zero pressure across the thickness of the perforated plate 24 causes the majority of the paper scraps to drop off the perforated plate and through the paper disposal opening 18, where the paper scraps may be collected. After a short time delay, compressed air jets from the at least one compressed air manifold 46 are directed along the upstream surface of the perforated plate 26 to dislodge any remaining paper scraps that may be clinging to the perforated plate 26.

The paper trap 10 is returned to a normal operating position by closing the paper disposal door 28 over the paper disposal opening 18; pivoting the bypass damper 38 such that the bypass inlet 22 is covered; and turning off the supply of pressurized air to the at least one compressed air manifold 46.

The paper trap 10 may be used in conjunction with the exhaust bypass damper 12 or any equivalent device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of filtering scraps of paper from an air flow, comprising the steps of:
   providing a chamber having a first inlet and a first outlet;
   retaining a plate having a plurality of openings formed therethrough in said first chamber;
   detecting a difference in pressure across a thickness of said plate;
   providing a second chamber having a dust inlet and a second outlet, connecting said first outlet to said dust inlet;
   opening a paper disposal opening below said plate, closing said dust inlet, opening a bypass inlet in said second chamber when said difference in pressure exceeds a specified amount; and
   flowing air having scraps of paper through said first chamber.

2. The method of filtering scraps of paper from an air flow of claim 1, further comprising the step of:
   providing at least one compressed air manifold adjacent a front surface of said plate, flowing compressed air through said at least one compressed air manifold to remove the scraps of paper clinging to said plate.

3. A method of filtering scraps of paper from an air flow, comprising the steps of:
   providing a first chamber having a first inlet and a first outlet;
   retaining a plate having a plurality of openings formed therethrough in said first chamber;
   flowing air having scraps of paper through said first chamber; and
   opening a paper disposal opening below said plate, closing said first outlet, when the air flow through said plate is impeded.

4. The method of filtering scraps of paper from an air flow of claim 3, further comprising the step of:
   providing a second chamber having a dust inlet and a second outlet, connecting said first outlet to said dust inlet.

5. The method of filtering scraps of paper from an air flow of claim 3, further comprising the step of:
   detecting a difference in pressure across a thickness of said plate to determine if air flow is impeded through said plate.

6. The method of filtering scraps of paper from an air flow of claim 3, further comprising the step of:
   providing at least one compressed air manifold adjacent a front surface of said plate, flowing compressed air through said at least one compressed air manifold to remove the scraps of paper clinging to said plate.

7. A method of filtering scraps of paper from an air flow, comprising the steps of:
   providing a first chamber having a first inlet and a first outlet;
   retaining a plate having a plurality of openings formed therethrough in said first chamber;
   providing a second chamber having a dust inlet and a second outlet, connecting said first outlet to said dust inlet;
   flowing air having scraps of paper through said first and second chambers;
   opening a paper disposal opening below said plate, closing said dust inlet, opening a bypass inlet in said second chamber when the air flow through said plate is impeded; and
   providing means for removing the scraps of paper from said plate.

8. The method of filtering scraps of paper from an air flow of claim 7, further comprising the step of:
   detecting a difference in pressure in front of said plate and behind said plate to determine if air flow is impeded through said plate.

9. The method of filtering scraps of paper from an air flow of claim 7, further comprising the step of:
   providing said means for removing the scraps of paper as at least one compressed air manifold, said at least one compressed air manifold being adjacent a front surface of said plate, flowing compressed air through said at least one compressed air manifold to remove the scraps of paper clinging to said plate.

10. A method of filtering scraps of paper from an air flow, comprising the steps of:
    providing a chamber having a first inlet and a first outlet;
    retaining a plate having a plurality of openings formed therethrough in said first chamber;
    detecting a difference in pressure across a thickness of said plate;
    providing at least one compressed air manifold adjacent a front surface of said plate, flowing compressed air through said at least one compressed air manifold to remove the scraps of paper clinging to said plate; and
    flowing air having scraps of paper through said first chamber.

11. The method of filtering scraps of paper from an air flow of claim 10, further comprising the step of:
    providing a second chamber having a dust inlet and a second outlet, connecting said first outlet to said dust inlet.

12. The method of filtering scraps of paper from an air flow of claim 11, further comprising the step of:
    opening a paper disposal opening below said plate, closing said dust inlet, opening a bypass inlet in said second chamber when said difference in pressure exceeds a specified amount.

\* \* \* \* \*